United States Patent
Fujimoto

(10) Patent No.: US 10,181,758 B2
(45) Date of Patent: Jan. 15, 2019

(54) POWER SUPPLY APPARATUS AND METHOD FOR CONTROLLING POWER SUPPLY APPARATUS

(71) Applicant: Funai Electric Co., Ltd., Osaka (JP)

(72) Inventor: Yoshitaka Fujimoto, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 300 days.

(21) Appl. No.: 15/172,987

(22) Filed: Jun. 3, 2016

(65) Prior Publication Data

US 2016/0359374 A1  Dec. 8, 2016

(30) Foreign Application Priority Data

Jun. 3, 2015 (JP) .................... 2015-113093

(51) Int. Cl.
*H02J 50/12* (2016.01)
*H02J 7/02* (2016.01)
*H02M 7/48* (2007.01)

(52) U.S. Cl.
CPC .............. *H02J 50/12* (2016.02); *H02J 7/025* (2013.01); *H02M 2007/4818* (2013.01); *Y02B 70/1441* (2013.01)

(58) Field of Classification Search
CPC ........... G05F 1/656; H02J 50/12; H02J 7/025; H02M 2007/4818; Y02B 70/1441
See application file for complete search history.

(56) References Cited

U.S. PATENT DOCUMENTS

| 2006/0113970 A1* | 6/2006 | Stover ................... A61N 1/378 323/222 |
| 2011/0193417 A1 | 8/2011 | Hirasaka et al. |
| 2012/0267960 A1 | 10/2012 | Low et al. |
| 2014/0320074 A1 | 10/2014 | Joshi |

FOREIGN PATENT DOCUMENTS

| JP | 2011-166883 A | 8/2011 |
| WO | 98/20363 A1 | 5/1998 |

OTHER PUBLICATIONS

Extended European Search Report issued in corresponding European Application No. 16172644.3 dated Sep. 13, 2016 (7 pages).
Office Action issued in corresponding Chinese Application No. 201610390079.2 dated Apr. 28, 2018 (5 pages).

* cited by examiner

*Primary Examiner* — Robert Deberadinis
(74) *Attorney, Agent, or Firm* — Osha Liang LLP

(57) ABSTRACT

A power supply apparatus includes a resonant circuit that determines a resonant frequency, a drive unit that drives the resonant circuit, and a controller that causes the resonant frequency to change between a first resonant frequency and a second resonant frequency. The first resonant frequency is higher than a frequency of a drive signal of the drive unit and the second resonant frequency is lower than the frequency of the drive signal.

19 Claims, 10 Drawing Sheets

FIG. 6

| Capacitance of first capacitor | Shift amount | Coil current value (comparative example) | Capacitance of second capacitor | Coil current value (first example) |
|---|---|---|---|---|
| 2.503nF | 0 | 6A | 0 | 6A |
| 2.500nF | 0.10% | 6A | 0.006nF | 6A |
| 2.478nF | 1% | 3.5A | 0.05nF | 6A |
| 2.378nF | 5% | 1A | 0.25nF | 6A |
| 2.253nF | 10% | 0.9A | 0.5nF | 4.8A |
| 1.878nF | 25% | 0.15A | 1.25nF | 1.6A |

POWER SUPPLY APPARATUS AND METHOD FOR CONTROLLING POWER SUPPLY APPARATUS

TECHNICAL FIELD

This invention generally relates to a power supply apparatus and more particularly relates to a power supply apparatus including a resonant circuit.

BACKGROUND

Conventional power supply apparatuses comprise a resonant circuit (for example, see Patent Literature 1).

A wireless power transmission device of Patent Literature 1 comprises a resonant circuit. The wireless power transmission device comprises a resonant circuit and a variable voltage source. Moreover, the resonant circuit includes an inductor and a plurality of capacitors, the plurality of capacitors being configured to include a varicap. Moreover, the varicap has a property where a capacitance value decreases when a voltage value applied from the variable voltage source increases. As a result, this wireless power transmission device is able to adjust a resonant frequency established by an inductance of the inductor and a capacitance value (synthesized capacitance value) of the plurality of capacitors by adjusting the voltage value of the variable voltage source. As a result, even in a situation where the resonant frequency of the resonant circuit and a frequency of a drive signal of the variable voltage source are different (shifted), by adjusting the voltage value applied to the varicap, it becomes possible to make the resonant frequency of the resonant circuit and the frequency of the drive signal substantially equal.

Therefore, the wireless power transmission device of Patent Literature 1 is able to efficiently transmit power to a power receiving apparatus even in a situation where there is a shift in the resonant frequency of the resonant circuit due to the capacitance value (capacitance) of the capacitors of the resonant circuit having variability with regard to a design value.

CITATION LIST

Patent Literature

[Patent Literature 1] Japanese Patent Application Publication No. 2011-166883

According to the wireless power transmission device (power supply apparatus) of Patent Literature 1, a varicap is used to adjust the resonant frequency. Generally, a varicap has a disadvantage where compared to a normal capacitor (capacitor having a predetermined capacitance value) a withstand voltage and a withstand current are small. Therefore, in the wireless power transmission device (power supply apparatus) of Patent Literature 1, when the capacitance of the resonant circuit has variability with regard to the design value, it may be difficult to supply comparatively large power (for example, power of 100 mW or more). While a method is conceivable of manually adjusting the capacitance of the resonant circuit individually when producing the power supply apparatus, this method requires a long time for the adjustment operation and has low mass production properties (is not suited for mass production).

SUMMARY OF THE INVENTION

A power supply apparatus according to one or more embodiments of the present invention, even in a situation where a capacitance of a resonant circuit has variability with regard to a design value, can efficiently supply comparatively large power and has high mass production properties.

A power supply apparatus according to one or more embodiments of the present invention may comprise a resonant circuit that includes a power supply coil and a lumped parameter element; a drive unit that drives the resonant circuit; and a switching unit that switches between a first resonant state, where a resonant frequency of the resonant circuit becomes a first frequency that is higher than a frequency of a drive signal of the drive unit, and a second resonant state, where the resonant frequency becomes a second frequency that is lower than the frequency of the drive signal.

According to one or more embodiments of the present invention, as above, the power supply apparatus may comprise the switching unit that switches between the first resonant state, where the resonant frequency, which is determined by the power supply coil and the lumped parameter element, becomes the first frequency that is higher than the frequency of the drive signal of the drive unit, and the second resonant state, where the resonant frequency becomes the second frequency that is lower than the frequency of the drive signal. As a result, because a phase difference between a phase of the drive signal and a phase of a current (or a voltage) of the power supply coil can be made to be substantially 0 on average (substantially 0 in a situation where the phase difference is averaged over a time period of a certain extent) by switching between the first resonant state and the second resonant state, the resonant frequency of the resonant circuit and the frequency of the drive signal can be artificially substantially matched while supplying comparatively large power. Moreover, because the resonant frequency of the resonant circuit and the frequency of the drive signal can be artificially substantially matched by the switching unit, there is no need to manually adjust a capacitance of the resonant circuit. As a result of the above, even in a situation where the capacitance of the resonant circuit has variability with regard to a design value, comparatively large power can be efficiently supplied and mass production properties can be improved.

In one aspect, the power supply apparatus according to one or more embodiments of the present invention may be configured so that switching between the first resonant state and the second resonant state is performed based on the phase difference between the phase of the drive signal and the phase of at least the current or the voltage flowing in the power supply coil changing to a direction approaching 0 from a positive side or a negative side to become substantially 0; by being configured in this manner, switching is performed between the first resonant state and the second resonant state so the phase difference approaches 0, and the resonant frequency of the resonant circuit and the frequency of the drive signal can therefore be substantially matched more reliably.

According to one or more embodiments of the present invention, the switching unit may switch between the first resonant state and the second resonant state at a point when a value of the current flowing in the power supply coil becomes substantially 0 after the phase difference becomes substantially 0. As a result, switching between the first resonant state and the second resonant state is performed in a state where the value of the current flowing in the power supply coil is substantially 0; therefore, energy charged in the lumped parameter element (for example, a capacitor) being lost in conjunction with switching can be suppressed.

In the power supply apparatus according to one or more embodiments of the present invention, a period where the switching unit switches between the first resonant state and the second resonant state is longer than a period of the drive signal. Because the frequency of the drive signal of the drive unit is generally set to a comparatively high frequency, there is a situation where it is difficult to configure another component (switching unit) to be able to be driven at a frequency higher than the frequency of the drive signal. According to one or more embodiments of the present invention, by making the period of switching between the first resonant state and the second resonant state longer than the period of the drive signal, a drive frequency for driving the switching unit can be made lower than the frequency of the drive signal of the drive unit. As a result, the switching unit can be easily configured.

In the power supply apparatus according to one or more embodiments of the present invention, the lumped parameter element includes a first capacitor and a second capacitor connected to the power supply coil, and the switching unit may switch between the first resonant state, where the resonant frequency becomes the first frequency, which is determined by the power supply coil and the first capacitor, and the second resonant state, where the resonant frequency becomes the second frequency, which is determined by the power supply coil, the first capacitor, and the second capacitor. According to this configuration, the power supply apparatus can easily be configured to have the first resonant state and the second resonant state by appropriately setting a capacitance of the first capacitor and a synthesized capacitance of the first capacitor and the second capacitor.

According to one or more embodiments of the present invention, the first capacitor may be connected in series to the power supply coil, the second capacitor may be connected in parallel to the first capacitor, the switching unit includes a switch that is connected to the first capacitor and the second capacitor, and the switch may switch between the first resonant state where the first capacitor and the second capacitor are electrically disconnected, and the second resonant state where the first capacitor and the second capacitor are electrically connected. According to this configuration, switching between the first resonant state and the second resonant state can be performed easily by driving the switch to electrically connect or disconnect the first capacitor and the second capacitor.

According to one or more embodiments of the present invention, in the power supply apparatus including the first capacitor and the second capacitor, the drive unit includes a first drive unit connected to the first capacitor and a second drive unit connected to the second capacitor, and the switching unit may switch between the first resonant state where the first drive unit drives the resonant circuit, and the second resonant state where the first drive unit and the second drive unit drive the resonant circuit. According to this configuration, unlike a situation where, as the switching unit, the switch is provided to connect to the resonant circuit, worsening of properties due to switching loss and on-resistance arising in a situation of driving the switching unit can be suppressed.

According to one or more embodiments of the present invention, the power supply apparatus, further may comprise a voltage phase detector that detects the phase of the voltage applied to the power supply coil; wherein the switching unit may switch between the first resonant state and the second resonant state based on the phase difference between the phase of the drive signal of the drive unit and the phase of the voltage applied to the power supply coil becoming substantially 0. In a situation of detecting the phase of the current of the power supply coil, there is a need to use a shunt resistor that causes loss of energy or a coupler that causes shifting of the phase of the current of the power supply coil. In contrast thereto, in one or more embodiments of the present invention, by providing the power supply apparatus with the voltage phase detector that detects the phase of the voltage applied to the power supply coil, the phase difference between the phase of the drive signal of the drive unit and the phase of the voltage applied to the power supply coil can be detected without using a shunt resistor that causes loss of energy or a coupler that causes shifting of the phase of the current of the power supply coil. As a result, compared to the situation of detecting the phase of the current of the power supply coil, loss of energy and shifting of the phase of the current of the power supply coil can be suppressed. Moreover, by shifting of the phase of the current of the power supply coil being suppressed, the phase difference between the phase of the drive signal and the phase of the current (or the voltage) of the power supply coil can be made to be substantially 0 on average with more precision.

According to one or more embodiments of the present invention, a power supply apparatus may comprise a resonant circuit that determines a resonant frequency, a drive unit that drives the resonant circuit, and a controller that causes the resonant frequency to change between a first resonant frequency and a second resonant frequency. The first resonant frequency may be higher than a frequency of a drive signal of the drive unit and the second resonant frequency may be lower than the frequency of the drive signal.

According to one or more embodiments of the present invention, a method for controlling a power supply apparatus may comprise changing a resonant frequency of a resonant circuit between a first resonant frequency and a second resonant frequency based on a phase difference between a phase of a drive signal of a drive unit and a phase of at least one of a current and a voltage flowing in a power supply coil being eliminated. The first resonant frequency may be higher than a frequency of the drive signal, and the second resonant frequency may be lower than the frequency of the drive signal.

According to one or more embodiments of the present invention, as above, even in a situation where a capacitance of a resonant circuit has variability with regard to a design value, comparatively large power can be efficiently supplied and mass production properties can be improved.

BRIEF DESCRIPTION OF DRAWINGS

FIG. 6 is a diagram illustrating results of a comparison between the power supply apparatus according to one or more embodiments of the first example of the present invention and a power supply apparatus according to a comparative example.

DETAILED DESCRIPTION OF EMBODIMENTS

Embodiments of the present invention will be described in detail below, with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

First Example (Configuration of Power Supply Device)

Embodiments of a first example of the present invention will be described with reference to FIGS. 1 to 4. The power supply apparatus according to one or more embodiments of the first example of the present invention may supply power (as a non-contact power supply apparatus) to a power receiving apparatus 200 disposed near the power supply apparatus 100 without providing wiring or the like between the power supply apparatus 100 and the power receiving apparatus 200.

Figure 1:
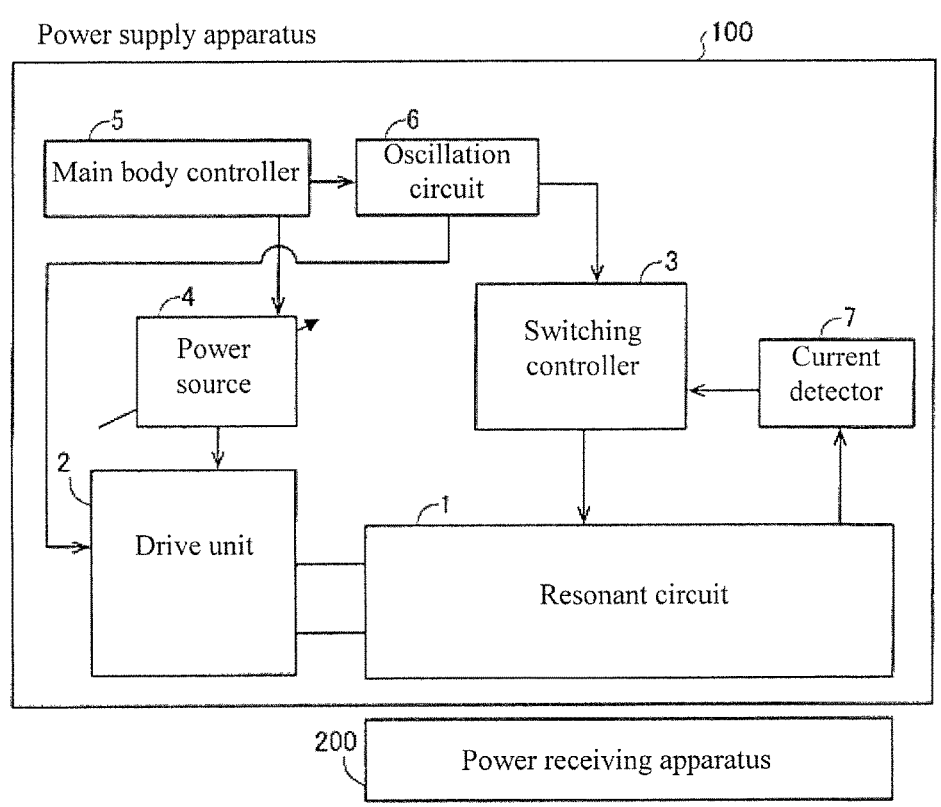
FIG. 1 is a block diagram illustrating an overall configuration of a power supply apparatus according to one or more embodiments of a first example of the present invention.
Figure 2:
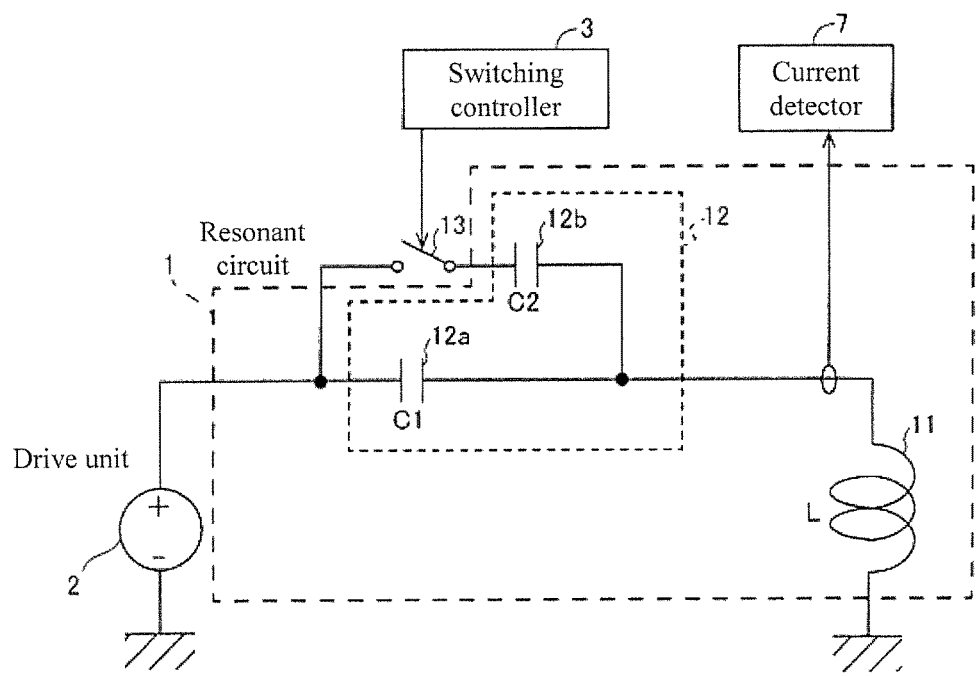
FIG. 2 is a circuit diagram schematically illustrating a resonant circuit of a power supply circuit according to the first example of the present invention.

As illustrated in FIG. 1, the power supply apparatus 100 comprises a resonant circuit 1, a drive unit 2, a switching controller 3, a power source 4, a main body controller 5, an oscillation circuit 6, and a current detector 7. Moreover, as illustrated in FIG. 2, the resonant circuit 1 includes a power supply coil 11, a lumped parameter element 12, and a switch 13. The switching controller 3 and the switch 13 are examples of the "switching unit."

According to one or more embodiments of the first example of the present invention, the switching controller 3 and the switch 13 may switch between a first resonant state, where a resonant frequency f—which is determined by the power supply coil 11 and the lumped parameter element 12—becomes a first frequency f1 that is higher than a drive frequency fd of a drive signal of the drive unit 2, and a second resonant state, where the resonant frequency f becomes a second frequency f2 that is lower than the drive frequency fd of the drive signal. That is, the power supply apparatus 100 may be able to supply power to the power receiving apparatus 200 by the resonant circuit 1 while switching between a power-supplying magnetic field having the first frequency f1 and a power-supplying magnetic field having the second frequency f2.

(Configuration of Each Unit of Power Supply Device)

Figure 4:
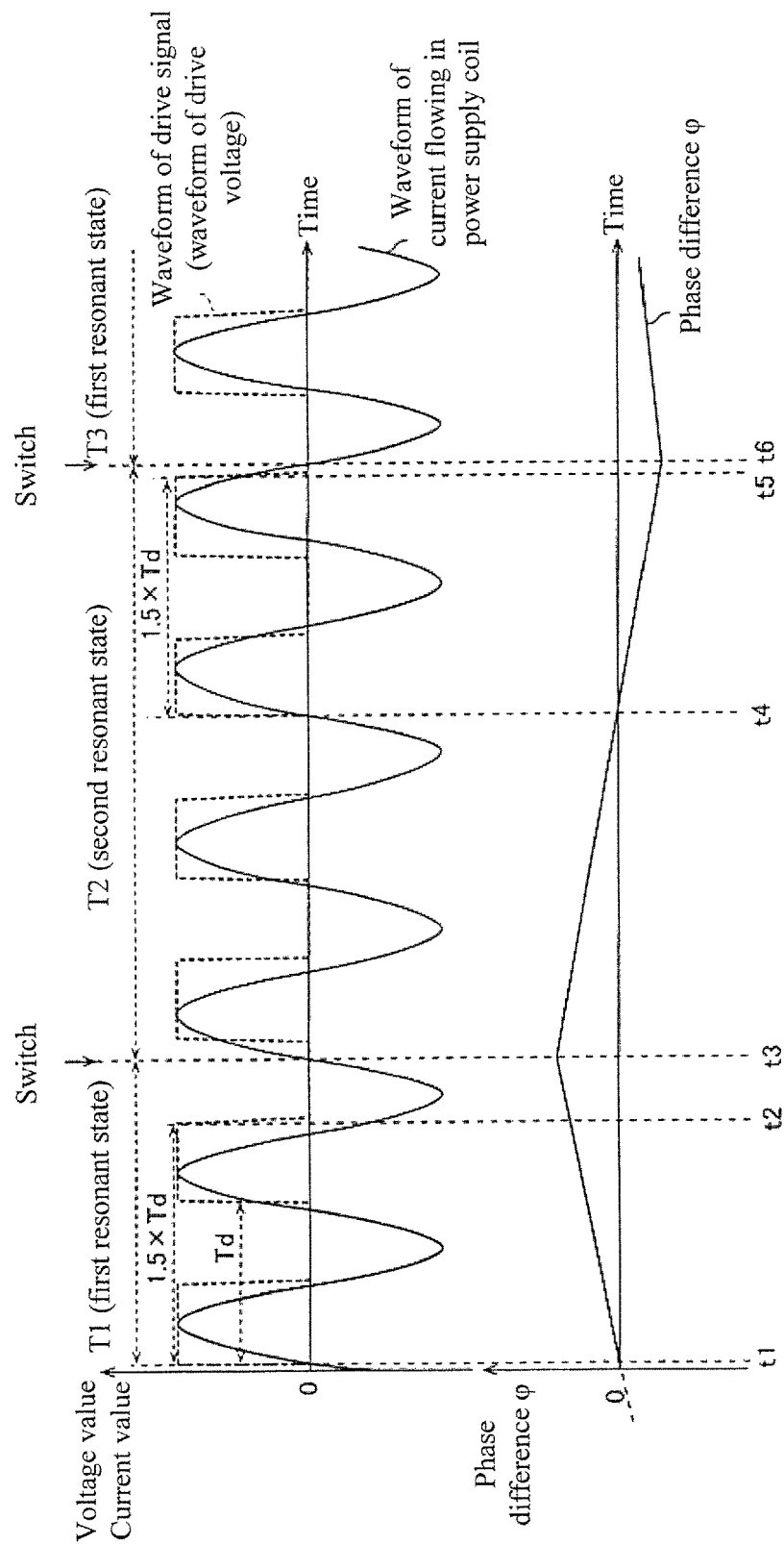
FIG. 4 is a diagram for describing a relationship between waveforms of a drive signal and a current flowing in a power supply coil of the power supply apparatus according to one or more embodiments of the first example of the present invention and a phase difference.

An alternating current flows in the resonant circuit 1 by a voltage according to the drive signal from the drive unit 2 being applied thereto (see FIG. 4). A frequency of this alternating current becomes the resonant frequency f, which is determined by an inductance of the power supply coil 11 and a capacitance (and inductance) of the lumped parameter element 12 in the resonant circuit 1.

According to one or more embodiments of the first example of the present invention, as illustrated in FIG. 2, the lumped parameter element 12 of the resonant circuit 1 includes a first capacitor 12a connected in series to the power supply coil 11 and a second capacitor 12b connected in parallel to the first capacitor 12a. Moreover, the switch 13 is connected to the first capacitor 12a and the second capacitor 12b and switches between a state of electrically disconnecting the first capacitor 12a and the second capacitor 12b (state where the switch 13 is turned off) and a state of electrically connecting the first capacitor 12a and the second capacitor 12b (state where the switch 13 is turned on).

In one or more embodiments of the present invention, the state of electrically disconnecting the first capacitor 12a and the second capacitor 12b is not limited to, for example, a state of entirely disconnecting connections between both poles of the first capacitor 12a and both poles of the second capacitor 12b and is described as signifying a state of becoming a circuit where, in a circuit including the drive unit 2 and the power supply coil 11, no current flows in the second capacitor 12b. Moreover, the state of electrically connecting the first capacitor 12a and the second capacitor 12b is described as signifying a state of becoming a circuit where, in the circuit including the drive unit 2 and the power supply coil 11, a current flows in the first capacitor 12a and the second capacitor 12b.

When the switch 13 disconnects the first capacitor 12a and the second capacitor 12b, while no current flows in the second capacitor 12b, a current flows in the first capacitor 12a and the power supply coil 11. In this situation, the resonant frequency f becomes the first frequency f1, which is determined by a capacitance C1 of the first capacitor 12a and an inductance L of the power supply coil 11.

Furthermore, in the state where the switch 13 connects the first capacitor 12a and the second capacitor 12b, the current flows in the second capacitor 12b, the first capacitor 12a, and the power supply coil 11. In this situation, the resonant frequency f becomes the second frequency f2, which is determined by a synthesized capacitance (C1+C2) of the first capacitor 12a and the second capacitor 12b and the inductance L of the power supply coil 11. In one or more embodiments of the present invention, a state where the resonant circuit 1 is driven at the first frequency f1 by the drive unit 2 is defined as the first resonant state and a state where the resonant circuit 1 is driven at the second frequency f2 by the drive unit 2 is defined as the second resonant state.

Furthermore, the more a value of an inductance or a capacitance of the resonant circuit 1 increases, the lower the resonant frequency f becomes. That is, because the synthesized capacitance (C1+C2) is greater than the capacitance (C1) of the first frequency f1, the second frequency f2 is lower than the first frequency f1. Moreover, the capacitance C1 of the first capacitor 12*a* and the capacitance C2 of the second capacitor 12*b* are set to values where the first frequency f1 becomes greater than the drive frequency fd of the drive unit 2 and the second frequency f2 becomes less than the drive frequency fd.

The drive unit 2 includes a gate drive circuit and a plurality of switching elements and is connected to the power source 4. Moreover, the drive unit 2 converts into power of an alternating current of the drive frequency fd and output to the resonant circuit 1 power supplied from the power source 4 by driving the plurality of switching elements by the gate drive circuit based on a signal from the oscillation circuit 6 having the drive frequency fd.

The drive frequency fd is set, for example, to a frequency established by a standard or the like (A4WP or the like) (6.78 MHz). As a result, the power supply apparatus 100 may be able to perform power supplying by a magnetic resonance method.

The power source 4 includes, for example, an AC/DC converter and acquires power of an alternating current from a commercial power source provided outside the power supply apparatus 100 (or power from a battery provided inside the power supply apparatus 100), rectifies the alternating current into a direct current, and outputs the acquired power. Moreover, the power source 4 may be able to change a voltage value to be output based on a command from the main body controller 5.

The main body controller 5 includes a CPU (central processing unit) or the like and may perform control of an entirety of the power supply apparatus 1, including, for example, the power supply unit 4.

The oscillation circuit 6 may output the signal having the drive frequency fd based on a command from the main body controller 5. Moreover, the oscillation circuit 6 may transmit the signal having the drive frequency fd to the drive unit 2 and the switching controller 3. A phase of the drive signal of the drive unit 2 and a phase of the signal having the drive frequency fd are substantially the same.

The current detector 7 includes, for example, a coupler, a shunt resistor, or the like and, as illustrated in FIG. 2, may detect a current value and a phase of the current flowing in the power supply coil 11 (resonant circuit 1). Moreover, the current detector 7 is connected to the switching controller 3 and may transmit information of the current value and the phase of the current flowing in the power supply coil 11 to the switching controller 3.

(Configuration of Switching Unit)

Figure 3:
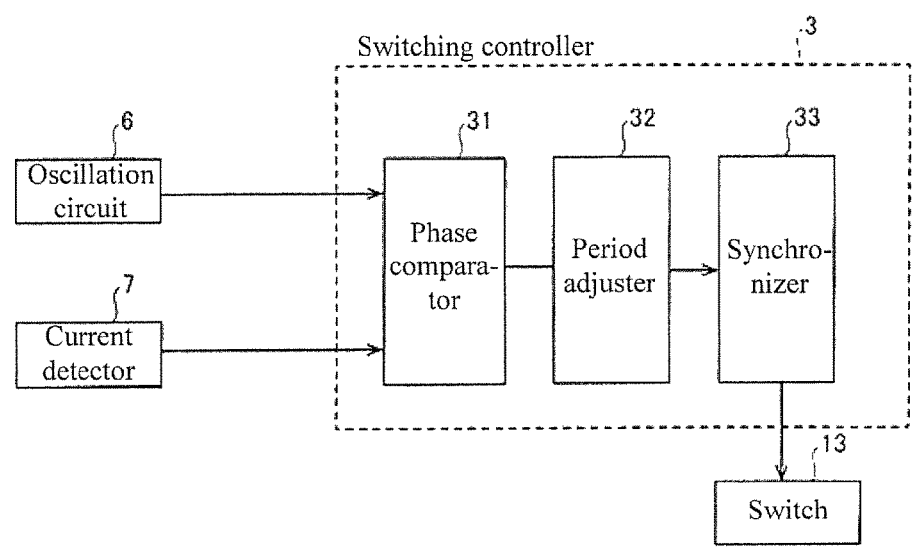
FIG. 3 is a block diagram illustrating a configuration of a switching controller of the power supply apparatus according to one or more embodiments of the first example of the present invention.

As illustrated in FIG. 3, the switching controller 3 includes a phase comparator 31, a period adjuster 32, and a synchronizer 33. Moreover, the switching controller 3 is connected to the oscillation circuit 6 and the current detector 7 and may acquire the signal having the drive frequency fd from the oscillation circuit 6 and the information of the current value and the phase of the current that flows from the current detector 7 to the power supply coil 11.

According to one or more embodiments of the first example of the present invention, as illustrated in FIG. 4, the switching controller 3 may switch from the first resonant state to the second resonant state based on a phase difference φ between the phase of the drive signal (phase of the signal having the drive frequency fd) and the phase of the current flowing in the power supply coil 11 changing in the first resonant state to a direction of approaching 0 from a negative side to become substantially 0 and afterward switch from the second resonant state to the first resonant state based on the phase difference φ changing in the second resonant state to a direction of approaching 0 from a positive side to become substantially 0. In other words, the switching controller 3 may causes the resonant frequency f to change between a first resonant frequency and a second resonant frequency based on the phase difference φ between the phase of the drive signal (phase of the signal having the drive frequency fd) and a phase of at least one of a current and a voltage flowing in the power supply coil 11 being eliminated. A resonant frequency of the first resonance (first resonant frequency) may be higher than a frequency of the drive signal, and a resonant frequency of the second resonance (second resonant frequency) may be lower than the frequency of the drive signal. The phase difference φ being on the positive side is defined as a state where the phase of the current flowing in the power supply coil 11 is early relative to the phase of the drive signal and the phase difference φ being on the negative side is defined as a state where the phase of the current flowing in the power supply coil 11 is delayed relative to the phase of the drive signal. This is described specifically below.

The phase comparator 31 includes a comparator circuit, a low-pass filter circuit, and a differential circuit and may output the phase difference φ between the phase of the signal having the drive frequency fd and the phase of the current flowing in the power supply coil 11 as a voltage value proportional to the phase difference φ. FIG. 4 illustrates the voltage value (phase difference φ) output by the phase comparator 31.

Furthermore, in one or more embodiments of the first example of the present invention, the period adjuster 32 and the synchronizer 33 may switch between the first resonant state (time periods T1 and T3) and the second resonant state (time period T2) by the switch 13 at a point when a value of the current flowing in the power supply coil 11 becomes substantially 0 (points t3 and t6) after the phase difference φ becomes substantially 0 (corresponding to points t1 and t4 illustrated in FIG. 4 (details described below).

Specifically, the period adjuster 32, after the phase difference φ changes to the direction approaching 0 from the negative side to become substantially 0 (point t1), after a predetermined time period is elapsed, transmits a signal for performing switching to the synchronizer 33 (signal for performing switching from the first resonant state to the second resonant state).

Furthermore, the synchronizer 33 includes, for example, a flip-flop circuit of a D type or the like and may detect a point of zero crossing of the current flowing in the power supply coil 11 (point when the current value becomes substantially 0). Moreover, the synchronizer 33, after acquiring the signal for performing switching to the synchronizer 33, transmits a signal that commands the switch 13 to connect the first capacitor 12*a* and the second capacitor 12*b* (signal for turning on) at a point when the value of the current flowing in the power supply coil 11 becomes substantially 0. In the above, an example of a configuration of transmitting the signal from the period adjuster 32 to the synchronizer 33 is illustrated, but a configuration may be such that the flip-flop circuit of the D type or the like is provided in the period adjuster 32 and the period adjuster 32 performs processing by also serving as the synchronizer 33.

Furthermore, the switch 13, by acquiring the signal that commands connecting the first capacitor 12*a* and the second capacitor 12*b* (signal for turning on) and switching from the disconnected state to the connected state (turning on the switch 13), switches the resonant circuit 1 from the first resonant state to the second resonant state.

Furthermore, the period adjuster 32, in a situation where the phase difference φ changes to the direction approaching 0 from the positive side to become substantially become 0 (point t4), after a predetermined time period is elapsed, transmits a signal for performing switching to the synchronizer 33 (signal for performing switching from the second resonant state to the first resonant state). The synchronizer 33, after acquiring the signal for performing switching to the synchronizer 33, transmits a signal that commands the switch 13 to place the first capacitor 12a and the second capacitor 12b in the disconnected state (signal for turning off) at a point when the value of the current flowing in the power supply coil 11 becomes substantially 0 (point t6).

Furthermore, the switch 13, by acquiring the signal that commands disconnection (signal for turning off) and switching from the connected state to the disconnected state, switches the resonant circuit 1 from the second resonant state to the first resonant state.

According to one or more embodiments of the first example of the present invention, a period where the switch 13 switches between the first resonant state and the second resonant state (time period T1) is longer than a period of the drive signal (inverse of the drive frequency fd) (time period Td). Specifically, the period adjuster 32, in a situation where the phase difference changes to the direction approaching 0 from the positive side or the negative side to become substantially 0, may transmit the signal for performing switching to the synchronizer 33 after a predetermined time period is elapsed. Moreover, the predetermined time period is set to be, for example, 1.5 times the period of the drive signal. As a result, the period where the switch 13 switches between the first resonant state and the second resonant state becomes longer than the period of the drive signal. The predetermined time period is not limited to being 1.5 times the period of the drive signal and may be set to a time period other than the time period of 1.5 times the period of the drive signal.

(Configuration of Power Receiving Apparatus)

Figure 5:
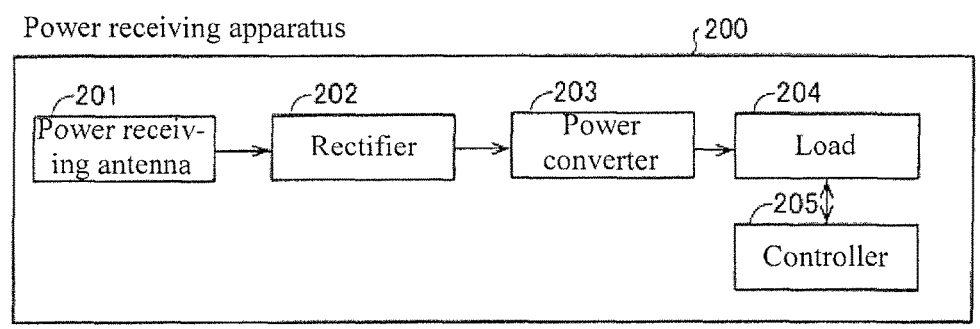
FIG. 5 is a block diagram illustrating a configuration of a power receiving apparatus according to one or more embodiments of the first example of the present invention.

Next, a configuration of the power receiving apparatus 200 is described with reference to FIG. 5.

The power receiving apparatus 200 includes a power receiving antenna 201, a rectifier 202, a power converter 203, a load 204, and a controller 205. For example, the power receiving apparatus 200 consists of a mobile phone (smart phone).

The power receiving antenna 201 includes a resonant circuit including an antenna coil, a resonant capacitor, and the like and may be able to electromagnetically couple with the power supply coil 11. Moreover, the power receiving antenna 201 may receive power from the power supply apparatus 100 by electromagnetically coupling with the power supply coil 11.

The rectifier 202 includes a plurality of diodes and the like and may convert the alternating current received by the power receiving antenna 201 into a direct current. Moreover, the power converter 203 includes a DC/DC converter and may convert into a predetermined voltage suited to driving the load 204 and apply to the load 204 a voltage of the power from the rectifier 202.

The load 204 consists of, for example, a secondary battery, and the secondary battery may be charged by the power from the power converter 203. Moreover, the controller 205 may perform control of the entire power receiving apparatus 200.

(Operation of Resonant Circuit and Switching Unit)

Next, an operation of the resonant circuit 1 and the switch 13 of the power supply apparatus 100 according to one or more embodiments of the first example of the present invention is described with reference to FIG. 4.

FIG. 4 illustrates one example of a voltage waveform of the drive signal applied to the resonant circuit 1 (waveform of a drive voltage) and a current waveform of the current flowing in the power supply coil 11 (waveform of a coil current). Moreover, FIG. 4 illustrates one example of an aspect of temporal change of the phase difference φ between the phase of the drive signal and the phase of the current flowing in the power supply coil 11 corresponding to the above waveforms.

At time periods T1 and T3, the resonant circuit 1 is placed in the first resonant state (first frequency f1>drive frequency fd) by the switching controller 3 and the switch 13. Moreover, at time period T2, the resonant circuit 1 is placed in the second resonant state (second frequency f2<drive frequency fd) by the switching controller 3 and the switch 13. As above, the period Td of the drive signal has relationships where T1>Td, T2>Td, and T3>Td.

In FIG. 4, point t1 is the point in the first resonant state when the phase difference φ changes to the direction approaching 0 from the negative side to become substantially 0. In this situation, at point t2 after a predetermined time period is elapsed (for example, 1.5×Td), the signal for performing switching is transmitted from the period adjuster 32 to the synchronizer 33.

Then, at point t3 when the current value of the power supply coil 11 becomes substantially 0, the switch 13 is controlled by the synchronizer 33 and the resonant circuit 1 is switched from the first resonant state to the second resonant state by the switch 13. From point t1 to point t3, the resonant circuit 1 is driven in the first resonant state and the phase difference φ changes from the negative side to the positive side after exceeding 0.

Then, from point t3 to t4, because the resonant circuit 1 is driven in the second resonant state, the phase difference φ changes toward 0 from the positive side.

At point t4, the phase difference φ changes to the direction approaching 0 from the positive side to become substantially 0. In this situation, at point t5 after a predetermined time period is elapsed (for example, 1.5×Td), the signal for performing switching is transmitted from the period adjuster 32 to the synchronizer 33.

Then, at point t6 when the current value of the power supply coil 11 becomes substantially 0, the switch 13 is controlled by the synchronizer 33 and the resonant circuit 1 is switched from the second resonant state to the first resonant state by the switch 13. Hereafter, as above, in the resonant circuit 1, switching between the first resonant state and the second resonant state is performed by the switch 13 and the switching controller 3, and the phase difference φ enters a state of being substantially 0 on average.

(Results of Comparison Between Power Supply Device According to Embodiments of First Example and Power Supply Device According to Comparative Example)

Next, results of a comparison between the power supply apparatus 100 according to one or more embodiments of the first example of the present invention and a power supply apparatus according to a comparative example not provided with the second capacitor 12b, the switching controller 3, and the switch 13 are described with reference to FIG. 6.

By changing a shift amount of the capacitance of the first capacitor 12a, the current value flowing in the power supply coil 11 is compared between the power supply apparatus 100 according to one or more embodiments of the first example of the present invention and the power supply apparatus according to the comparative example. The shift amount being 0% signifies that the resonant frequency f of the resonant circuit 1 and the drive frequency fd match.

In the power supply apparatus according to the comparative example, a resonant circuit consists of a first capacitor and a power supply coil and is not provided with the second capacitor 12b, the switching controller 3, and the switch 13. Moreover, with both the power supply apparatus 100 according to one or more embodiments of the first example of the present invention and the power supply apparatus according to the comparative example, the drive frequency fd is made to be 1 MHz and the inductance of the power supply coil 11 is made to be 10 μH; measurement of the current value flowing in the power supply coil 11 is performed by making the shift amount to be 0% in a situation where the capacitance of the first capacitor 12a is 2.503 nF and making a Q value (quality factor) of the resonant circuit 1 to be 600.

First, in a situation where the capacitor of 2.503 nF whose shift amount is 0% is used for both the first capacitor 12a of the power supply apparatus 100 according to one or more embodiments of the first example of the present invention and the power supply apparatus according to the comparative example, a current of 6 A flowed in both the power supply coil 11 of the power supply apparatus 100 according to one or more embodiments of the first example of the present invention and the power supply coil of the power supply apparatus according to the comparative example.

Furthermore, in a situation where a capacitor of 2.500 nF whose shift amount is 0.10% is used for both the first capacitor 12a of the power supply apparatus 100 according to one or more embodiments of the first example of the present invention and the power supply apparatus according to the comparative example and the capacitance of the second capacitor 12b of the power supply apparatus 100 is made to be 0.006 nF, a current of 6 A flowed in both the power supply coil 11 of the power supply apparatus 100 according to one or more embodiments of the first example of the present invention and the power supply coil of the power supply apparatus according to the comparative example.

Next, in a situation where a capacitor of 2.478 nF whose shift amount is 1% is used for both the first capacitor 12a of the power supply apparatus 100 according to one or more embodiments of the first example of the present invention and the power supply apparatus according to the comparative example and the capacitance of the second capacitor 12b of the power supply apparatus 100 is made to be 0.05 nF, while a current of 6 A flowed in the power supply coil 11 of the power supply apparatus 100 according to one or more embodiments of the first example of the present invention, a current of 3.5 A flowed in the power supply coil of the power supply apparatus according to the comparative example.

Furthermore, in a situation where a capacitor of 2.378 nF whose shift amount is 5% is used for both the first capacitor 12a of the power supply apparatus 100 according to one or more embodiments of the first example of the present invention and the power supply apparatus according to the comparative example and the capacitance of the second capacitor 12b of the power supply apparatus 100 is made to be 0.25 nF, while a current of 6 A flowed in the power supply coil 11 of the power supply apparatus 100 according to one or more embodiments of the first example of the present invention, a current of 1.0 A flowed in the power supply coil of the power supply apparatus according to the comparative example.

That is, it is found that in a situation where a capacitor whose shift amount is 1 to 5% is used as the first capacitor 12a, while efficiency of power supply (efficiency of propagating power from the resonant circuit to a drive unit) in the power supply apparatus according to the comparative example decreases, efficiency of power supply in the power supply apparatus 100 according to one or more embodiments of the first example of the present invention does not decrease.

Next, in a situation where a capacitor of 2.253 nF whose shift amount is 10% is used for both the first capacitor 12a of the power supply apparatus 100 according to one or more embodiments of the first example of the present invention and the power supply apparatus according to the comparative example and the capacitance of the second capacitor 12b of the power supply apparatus 100 is made to be 0.5 nF, while a current of 4.8 A flowed in the power supply coil 11 of the power supply apparatus 100 according to one or more embodiments of the first example of the present invention, a current of 0.9 A flowed in the power supply coil of the power supply apparatus according to the comparative example.

Furthermore, in a situation where a capacitor of 1.878 nF whose shift amount is 25% is used for both the first capacitor 12a of the power supply apparatus 100 according to one or more embodiments of the first example of the present invention and the power supply apparatus according to the comparative example and the capacitance of the second capacitor 12b of the power supply apparatus 100 is made to be 1.25 nF, while a current of 1.6 A flowed in the power supply coil 11 of the power supply apparatus 100 according to one or more embodiments of the first example of the present invention, a current of 0.15 A flowed in the power supply coil of the power supply apparatus according to the comparative example.

That is, it is found that in a situation where a capacitor whose shift amount is 10 to 25% is used as the first capacitor 12a, while efficiency of power supply in the power supply apparatus according to the comparative example decreases remarkably, efficiency of power supply in the power supply apparatus 100 according to one or more embodiments of the first example of the present invention is suppressed from decreasing.

From the above results, it is found that in the power supply apparatus 100 according to one or more embodiments of the first example of the present invention, even in a situation where the capacitance of the resonant circuit 1 has variability (shift amount) with regard to a design value, comparatively large power (for example, 100 mA or more) can be efficiently supplied to the power receiving apparatus 200.

Effects of First Example

According to one or more embodiments of the first example of the present invention, one or more of the following effects can be obtained.

According to one or more embodiments of the first example of the present invention, as above, the power supply apparatus 100 includes the switching controller 3 and the switch 13 that switch between the first resonant state, where the resonant frequency f of the resonant circuit 1—which is determined by the power supply coil 11 and the lumped parameter element 12—becomes the first frequency f1 that is higher than the drive frequency fd of the drive unit 2, and the second resonant state, where the resonant frequency f becomes the second frequency f2 that is lower than the drive frequency fd. As a result, because the phase difference φ between the phase of the drive signal and the phase of the current of the power supply coil 11 can be made to be substantially 0 on average (substantially 0 in a situation where the phase difference φ is averaged over a time period of a certain extent) by switching between the first resonant state and the second resonant state, the resonant frequency f of the resonant circuit 1 and the drive frequency fd can be artificially substantially matched while supplying comparatively large power. Moreover, because the resonant frequency f of the resonant circuit 1 and the drive frequency fd can be artificially substantially matched by the switching controller 3 and the switch 13, there is no need to manually adjust the capacitance (of the first capacitor 12a) of the resonant circuit 1. As a result of the above, even in a situation where the capacitance (of the first capacitor 12a) of the resonant circuit 1 has variability with regard to the design value, comparatively large power can be efficiently supplied and mass production properties can be improved.

Furthermore, according to one or more embodiments of the first example of the present invention, as above, the switching controller 3 and the switch 13 are configured to switch between the first resonant state and the second resonant state based on the phase difference φ between the phase of the drive signal and the phase of the current flowing in the power supply coil 11 changing to the direction approaching 0 from the positive side or the negative side to become substantially 0. That is, the switching controller 3 and the switch 13 are configured to switch from the first resonant state to the second resonant state based on the phase difference φ between the phase of the drive signal and the phase of the current flowing in the power supply coil 11 changing in the first resonant state to the direction of approaching 0 from one side, positive or negative, to become substantially 0 and afterward switch from the second resonant state to the first resonant state based on the phase difference φ changing in the second resonant state to the direction of approaching 0 from the other side, positive or negative, to become substantially 0. As a result, switching is performed between the first resonant state and the second resonant state so the phase difference φ approaches 0; therefore, the resonant frequency f of the resonant circuit 1 and the drive frequency fd can be more reliably substantially matched.

Furthermore, according to one or more embodiments of the first example of the present invention, as above, the switching controller 3 and the switch 13 are configured to switch between the first resonant state and the second resonant state at a point when the value of the current flowing in the power supply coil 11 becomes substantially 0 after the phase difference y becomes substantially 0. As a result, switching between the first resonant state and the second resonant state is performed in a state where the value of the current flowing in the power supply coil 11 is substantially 0; therefore, energy charged in the lumped parameter element 12 (the first capacitor 12a and the second capacitor 12b) being lost in conjunction with switching can be suppressed.

Furthermore, according to one or more embodiments of the first example of the present invention, as above, the period where the switching controller 3 and the switch 13 switch between the first resonant state and the second resonant state (time periods T1 to T3) is longer than the period Td of the drive signal. Because the drive frequency fd of the drive unit 2 is generally set to a comparatively high frequency, there is a situation where it is difficult to configure the switching controller 3 and the switch 13 to be able to be driven at a frequency higher than the drive frequency fd. In consideration of this point, according to one or more embodiments of the first example of the present invention, by making the period of switching between the first resonant state and the second resonant state (time periods T1, T2, and T3) longer than the period Td of the drive signal, the frequency for driving the switch 13 can be made lower than the drive frequency fd of the drive signal of the drive unit. As a result, the switching controller 3 and the switch 13 can be easily configured.

Furthermore, according to one or more embodiments of the first example of the present invention, as above, the lumped parameter element 12 includes the first capacitor 12a and the second capacitor 12b connected to the power supply coil 11 and the switching controller 3 and the switch 13 are configured to switch between the first resonant state, where the resonant frequency f becomes the first frequency f1—which is determined by the power supply coil 11 and the first capacitor 12a—and the second resonant state, where the resonant frequency f becomes the second frequency f2—which is determined by the power supply coil 11, the first capacitor 12a, and the second capacitor 12b. As a result, the power supply apparatus 100 can easily be configured to have the first resonant state and the second resonant state by appropriately setting the capacitance C1 of the first capacitor 12a and the synthesized capacitance (C1+C2) of the first capacitor 12a and the second capacitor 12b.

Furthermore, according to one or more embodiments of the first example of the present invention, as above, the first capacitor 12a is connected in series to the power supply coil 11, the second capacitor 12b is connected in parallel to the first capacitor 12a, and the switch 13 is connected to the first capacitor 12a and the second capacitor 12b. Moreover, the switch 13 may switch between the first resonant state where the first capacitor 12a and the second capacitor 12b are electrically disconnected, and the second resonant state where the first capacitor 12a and the second capacitor 12b are electrically connected. As a result, switching between the first resonant state and the second resonant state can be performed easily by driving the switch 13 to electrically connect or disconnect the first capacitor 12a and the second capacitor 12b.

Second Example

Next, embodiments of a second example of the present invention will be described with reference to FIG. 7. The power supply apparatus 300 according to embodiments of the second example of the present invention may include a voltage detector 307 unlike the power supply apparatus 100 according to embodiments of the first example of the present invention including the current detector 7. Configurations identical to those of embodiments of the first example of the present invention are referred to the same reference signs and description thereof is omitted.

(Configuration of Power Supply Device According to Second Example)

Figure 7:
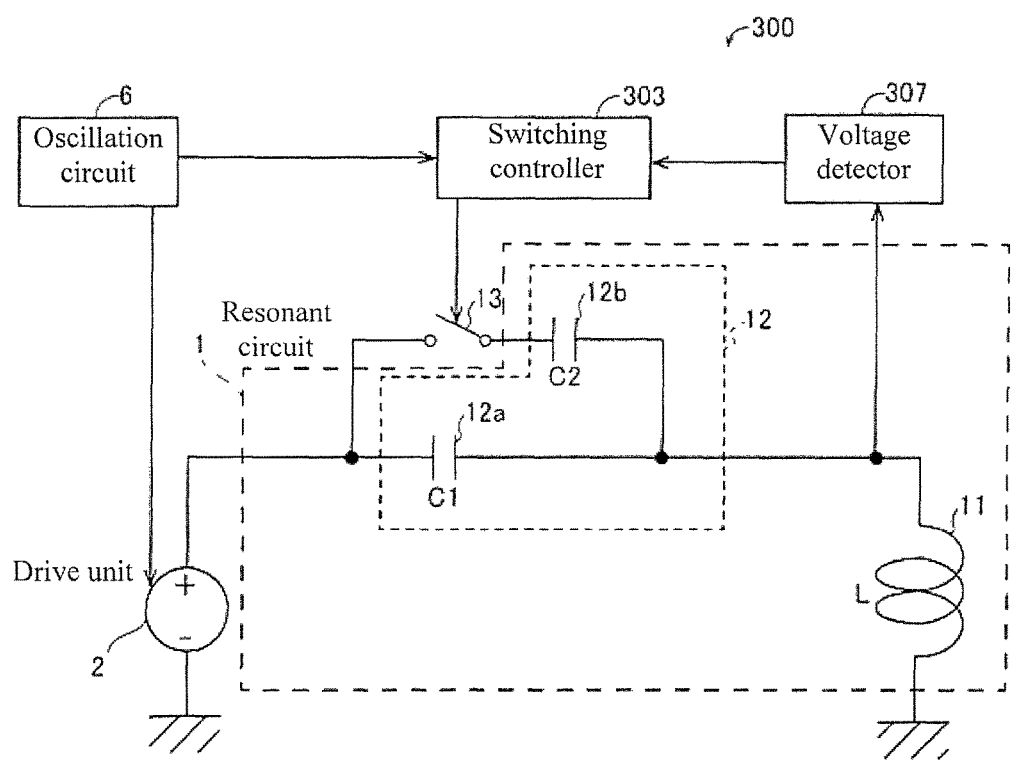
FIG. 7 is a circuit diagram schematically illustrating the resonant circuit of a power supply circuit according to one or more embodiments of a second example of the present invention.

As illustrated in FIG. 7, the power supply apparatus 300 according to one or more embodiments of the second example of the present invention includes a switching controller 303 and the voltage detector 307. The switching controller 303 is one example of the "switching unit (switching controller)." Moreover, the voltage detector 307 is one example of the "voltage phase detector."

According to one or more embodiments of the second example of the present invention, the voltage detector 307 may detect a phase of the voltage applied to the power supply coil 11 and may transmit information of the phase of the voltage to the switching controller 303. Moreover, the switching controller 303 and the switch 13 are configured to switch between the first resonant state and the second resonant state based on a phase difference φ between the phase of the drive signal of the drive unit 2 and the phase of the voltage applied to the power supply coil 11 acquired by the voltage detector 307 becoming substantially 0.

For example, the switching controller 303 may acquire a phase difference φ between a phase offset 90 degrees from the signal having the drive frequency fd acquired from the oscillation circuit 6 and the phase of the voltage applied to the power supply coil 11. According to one or more embodiments of the second example of the present invention, the phase of the drive signal is described as the phase offset 90 degrees from the signal having the drive frequency fd acquired from the oscillation circuit 6. That is, because the phase detected by the voltage detector 307 is shifted 90 degrees from the phase detected by the current detector 7 of the power supply apparatus 100 according to one or more embodiments of the first example of the present invention, by an offset such as above, the switching controller 303 can acquire the phase difference φ similarly to the switching controller 3 in the power supply apparatus 100 according to one or more embodiments of the first example of the present invention.

Furthermore, the power supply apparatus 300 according to one or more embodiments of the second example of the present invention, similarly to the power supply apparatus 100 according to one or more embodiments of the first example of the present invention, may switch the resonant circuit 1 between the first resonant state and the second resonant state by the switching controller 303 and the switch 13 based on the phase difference φ from the phase of the voltage applied to the power supply coil 11 becoming substantially 0.

Furthermore, other configurations of the power supply apparatus 300 according to one or more embodiments of the second example of the present invention are similar to those of the power supply apparatus 100 according to one or more embodiments of the first example of the present invention.

Effects of Second Example

According to one or more embodiments of the second example of the present invention, one or more of the following effects can be obtained.

In one or more embodiments of the second example of the present invention, as above, the power supply apparatus 300 includes the voltage detector 307 that detects the phase of the voltage applied to the power supply coil 11, and the switch controller 307 and the switch 13 are configured to switch between the first resonant state and the second resonant state based on the phase difference φ between the phase of the drive signal of the drive unit 2 and the phase of the voltage applied to the power supply coil 11 becoming substantially 0. In the situation of detecting the phase of the current of the power supply coil 11, there is a need to use the shunt resistor that causes loss of energy or the coupler that causes shifting of the phase of the current of the power supply coil 11. In contrast thereto, in one or more embodiments of the second example of the present invention, by providing the power supply apparatus 300 with the voltage detector 307 that detects the phase of the voltage applied to the power supply coil 11, the phase difference φ between the phase of the drive signal of the drive unit 2 and the phase of the voltage applied to the power supply coil 11 can be detected without using the shunt resistor that causes loss of energy or the coupler that causes shifting of the phase of the current of the power supply coil 11. As a result, compared to the situation of detecting the phase of the current of the power supply coil 11, loss of energy and shifting of the phase of the current of the power supply coil 11 can be suppressed. Moreover, by shifting of the phase of the current of the power supply coil 11 being suppressed, the phase difference φ between the phase of the drive signal and the phase of the current of the power supply coil 11 can be made to be substantially 0 on average with more precision.

Furthermore, other effects of the power supply apparatus 300 according to one or more embodiments of the second example of the present invention are similar to those of the power supply apparatus 100 according to one or more embodiments of the first example of the present invention.

Third Example

Next, embodiments of a third example of the present invention will be described with reference to FIG. 8. The power supply apparatus 400 according to embodiments the third example of the present invention may include two drive units (a first drive unit 402a and a second drive unit 402b) unlike the power supply apparatus 100 according to embodiments of the first example of the present invention including one drive unit 2. Configurations identical to those of embodiments of the first or the second example are referred to the same reference signs and description thereof is omitted.

(Configuration of Power Supply Device According to Third Embodiment)

Figure 8:
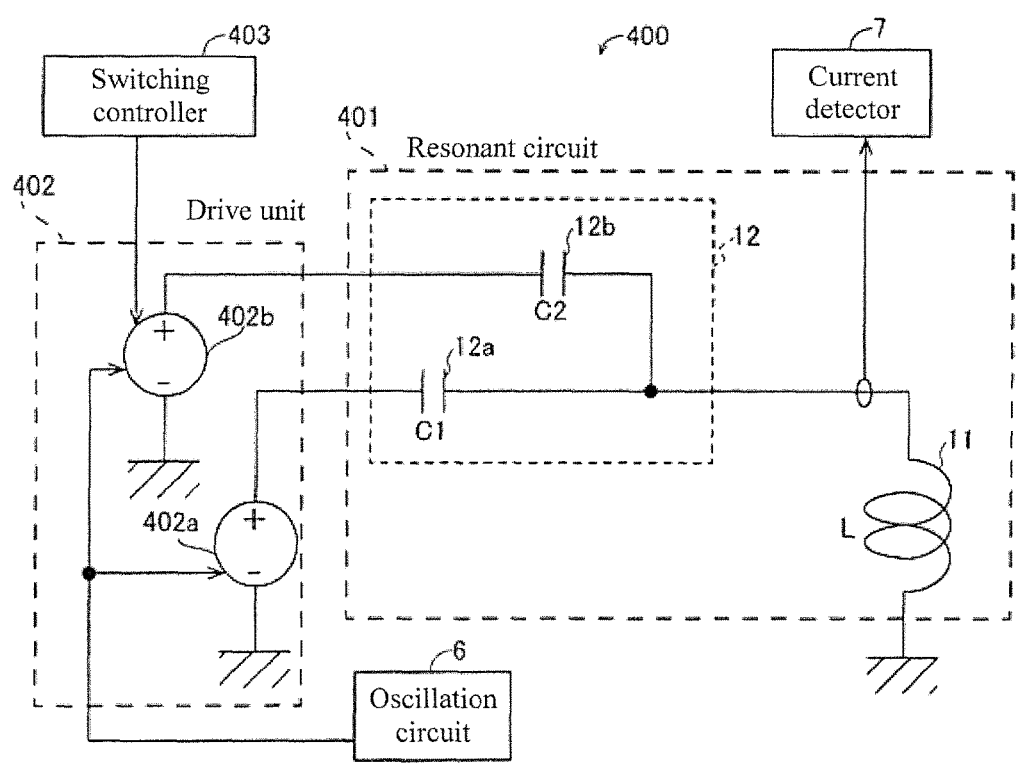
FIG. 8 is a circuit diagram schematically illustrating a resonant circuit of a power supply circuit according to one or more embodiments of a third example of the present invention.

As illustrated in FIG. 8, the power supply apparatus 400 according to one or more embodiments of the third example of the present invention includes a resonant circuit 401, a drive unit 402, and a switching controller 403.

According to one or more embodiments of the third example of the present invention, the drive unit 402 includes the first drive unit 402a, which is connected to the first capacitor 12a, and the second drive unit 402b, which is connected to the second capacitor 12b. Moreover, the switching controller 403 may switch between the first resonant state where the first drive unit 402a drives the resonant circuit 401, and the second resonant state where the first drive unit 402a and the second drive unit 402b drive the resonant circuit 401.

Figure 9:
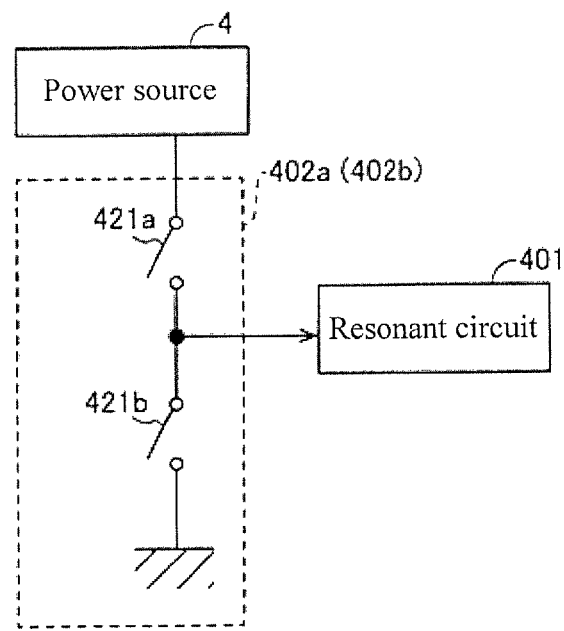
FIG. 9 is a circuit diagram schematically illustrating a first drive unit and a second drive unit of the power supply circuit according to one or more embodiments of the third example of the present invention.

Specifically, as illustrated in FIG. 9, the first drive unit 402a and the second drive unit 402b each include switches 421a and 421b and are configured to respectively cut the connection with the resonant circuit 401 in a half-impedance state. As a result, with the first drive unit 402a and the second drive unit 402b, power output from one side flowing into the drive unit on another side is suppressed.

Furthermore, as illustrated in FIG. 8, the first drive unit 402a is connected to the oscillation circuit 6 and may drive the resonant circuit 401 according to a drive signal from the oscillation circuit 6.

Furthermore, the second drive unit 402b is connected to the oscillation circuit 6 and the switching controller 403 and may drive the resonant circuit 401 (the second capacitor 12b and the power supply coil 11) according to the drive signal from the oscillation circuit 6 only in a situation where the second resonant state is selected by the switching controller 403.

As a result, in the state where the resonant circuit 401 is driven only by the first drive unit 402a, the resonant frequency f becomes the first frequency f1 and enters the first resonant state. In the state where the resonant circuit 401 is driven by both the first drive unit 402a and the second drive unit 402b, the resonant frequency f becomes the second frequency f2 and enters the second resonant state.

The switching controller 403 may acquire a phase difference φ between a phase of a drive signal of the drive unit 402 and the phase of the voltage applied to the power supply coil 11 similarly to the switching controller 3 of the power supply apparatus 100 according to one or more embodiments of the first example of the present invention. Moreover, the switching controller 403, based on the phase difference φ becoming substantially 0, may switch between the state of driving the resonant circuit 401 by the first drive unit 402a (first resonant state) and the state of driving the resonant circuit 401 by the first drive unit 402a and the second drive unit 402b (second resonant state).

Furthermore, other configurations of the power supply apparatus 400 according to one or more embodiments of the third example of the present invention are similar to those of the power supply apparatus 100 according to one or more embodiments of the first example of the present invention.

Effects of Third Example

According to one or more embodiments of the third example of the present invention, one or more of the following effects can be obtained.

In embodiments of the third example of the present invention, as above, the drive unit 402 includes the first drive unit 402a, which is connected to the first capacitor 12a, and the second drive unit 402b, which is connected to the second capacitor 12b, and the switching controller 403 may switch between the first resonant state where the first drive unit 402a drives the resonant circuit 401, and the second resonant state where the first drive unit 402a and the second drive unit 402b drive the resonant circuit 401. As a result, unlike when the switching unit includes the switch 13 connecting to the resonant circuit 401, worsening of properties due to switching loss and on-resistance arising in a situation of driving the switch 13 (switch) can be suppressed.

Furthermore, other effects of the power supply apparatus 400 according to one or more embodiments of the third example of the present invention are similar to those of the power supply apparatus 100 according to one or more embodiments of the first example of the present invention.

Modified Examples

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

For example, in one or more embodiments of the first to third examples of the present invention, an example is illustrated where the power receiving apparatus is applied as a mobile phone (smart phone), but the present invention is not limited thereto. In one or more embodiments of the present invention, the power receiving apparatus may be applied as a device other than a mobile phone. For example, it may be applied as a device such as an electric automobile.

Furthermore, in one or more embodiments of the first to third examples of the present invention, an example is illustrated where the first capacitor and the second capacitor are used as the lumped parameter element, but the present invention is not limited thereto. In one or more embodiments of the present invention, elements other than the first capacitor and the second capacitor may be used as the lumped parameter element. For example, in a power supply apparatus 500 according to one or more embodiments of a modified first example of the present invention illustrated in FIG. 10, a lumped parameter element 512 includes a capacitor 512a and an inductor 512b.

Figure 10:
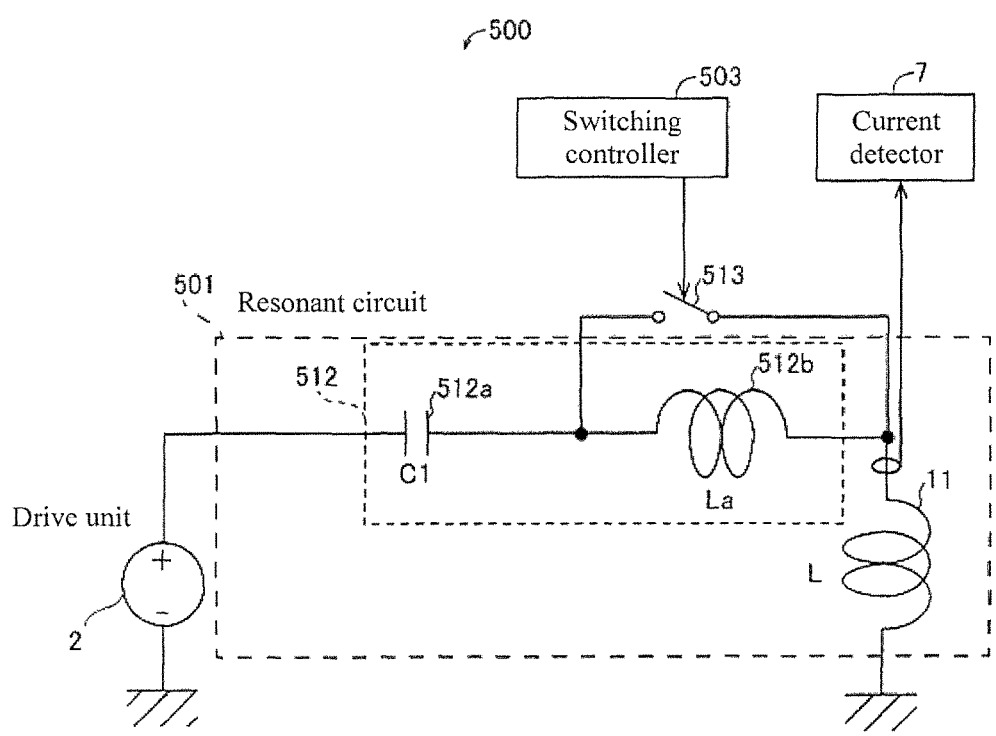
FIG. 10 is a circuit diagram schematically illustrating a resonant circuit of a power supply circuit according to one or more embodiments of a modified first example of the present invention.

As illustrated in FIG. 10, a resonant circuit 501 of the power supply apparatus 500 according to one or more embodiments of the modified first example of the present invention includes the power supply coil 11 and the lumped parameter element 512, and the lumped parameter element 512 includes the capacitor 512a, which is connected in series to the power supply coil 11, and the inductor 512b, which is connected in series to the first capacitor 512a. Moreover, the resonant circuit 501 includes a switch 513 connected in parallel to the inductor 512b. As a result, by the switch 513 turning on, a resonant frequency of the resonant circuit 501 becomes the first frequency f1 (first resonant state), which is determined by the capacitor 512a (for example, the capacitance C1) and the power supply coil 11 (for example, the inductance L), and by the switch 513 turning off, the resonant frequency of the resonant circuit 501 becomes the second frequency f2 (second resonant state), which is determined by the capacitor 512a (for example, the capacitance C1), the inductor 512b (for example, an inductance La), and the power supply coil 11 (inductance L). As a result, even by the power supply apparatus 500 according to one or more embodiments of the modified first example of the present invention, it becomes possible to switch the resonant circuit 501 between the first resonant state and the second resonant state. The capacitor 512a and the inductor 512b are one example of the "lumped parameter element."

Furthermore, in one or more embodiments of the first to third examples of the present invention, an example (see FIG. 4) is illustrated of configuring the switching unit to switch between the first resonant state and the second resonant state at the point when the value of the current flowing in the power supply coil becomes substantially 0 after the phase difference becomes substantially 0, but the present invention is not limited thereto. For example, in one or more embodiments of the present invention, a configuration may be such that switching between the first resonant state and the second resonant state is performed immediately after the phase difference becomes substantially 0.

Furthermore, in one or more embodiments of the first to third examples of the present invention, an example is illustrated where the period where the switching unit switches between the first resonant state and the second resonant state is made longer than the period of the drive signal, but the present invention is not limited thereto. In one or more embodiments of the present invention, the period where the switching unit switches between the first resonant state and the second resonant state may be set equal to or less than the period of the drive signal.

Furthermore, in one or more embodiments of the third example of the present invention, an example is illustrated where the switching unit may switch between the first resonant state where the first drive unit drives the resonant circuit and the second resonant state where the first drive unit and the second drive unit drive the resonant circuit, but the present invention is not limited thereto. In one or more embodiments of the present invention, the switching unit may be configured to switch between a first resonant state where the first drive unit drives the resonant circuit and a second resonant state where only the second drive unit drives the resonant circuit. In this situation, for example, by making the capacitance of the second capacitor to be C1+C2, a configuration such as above is enabled.

EXPLANATION OF REFERENCES 1, 401, 501 Resonant circuit
2, 402 Drive unit
3, 303, 403, 503 Switching controller (controller, switching unit)
11 Power supply coil
12, 512 Lumped parameter element
12a First capacitor
12b Second capacitor
13, 513 Switch (switching unit)
100, 300, 400, 500 Power supply apparatus
307 Voltage detector (voltage phase detector)
402a First drive unit
402b Second drive unit
512a Condenser (lumped parameter element)
512b Inductor (lumped parameter element)

What is claimed is:

1. A power supply apparatus comprising:
a resonant circuit that comprises a power supply coil and determines a resonant frequency;
a drive unit that drives the resonant circuit; and
a controller that causes the resonant frequency to change between a first resonant frequency and a second resonant frequency based on a phase difference between a phase of a drive signal of the drive unit and a phase of at least one of a current and a voltage flowing in the power supply coil being eliminated,
wherein the first resonant frequency is higher than a frequency of the drive signal, and
wherein the second resonant frequency is lower than the frequency of the drive signal.

2. The power supply apparatus according to claim 1, wherein the controller causes the resonant frequency to change between the first resonant frequency and the second resonant frequency after a predetermined time period is elapsed from when the phase difference is eliminated.

3. The power supply apparatus according to claim 2, wherein the predetermined time period is longer than a period of the drive signal.

4. The power supply apparatus according to claim 3, wherein the predetermined time period is 1.5 times the period of the drive signal.

5. The power supply apparatus according to claim 2, wherein the predetermined time period is shorter than a period of the drive signal.

6. The power supply apparatus according to claim 1, wherein the controller causes the resonant frequency to change between the first resonant frequency and the second resonant frequency when a value of the current flowing in the power supply coil becomes zero after the phase difference is eliminated.

7. The power supply apparatus according to claim 1, further comprising: a phase comparator that outputs the phase difference as a voltage value proportional to the phase difference.

8. The power supply apparatus according to claim 1, further comprising:
a synchronizer; and
a period adjuster that sends, to the synchronizer, a signal for changing between the first resonant frequency and the second resonant frequency after a predetermined time period from when the phase difference is eliminated.

9. The power supply apparatus according to claim 1, wherein the resonant circuit comprises a lumped parameter element.

10. The power supply apparatus according to claim 9, wherein
the lumped parameter element comprises a first capacitor and a second capacitor connected to the power supply coil,
the first resonant frequency is determined by the power supply coil and the first capacitor, and
the second resonant frequency is determined by the power supply coil, the first capacitor and the second capacitor.

11. The power supply apparatus according to claim 10, wherein
the first capacitor is connected in series to the power supply coil,
the second capacitor is connected in parallel to the first capacitor,
the power supply apparatus further comprises a switch connected to the first capacitor and the second capacitor, and
the switch switches between connection and disconnection between the first capacitor and the second capacitor.

12. The power supply apparatus according to claim 10, wherein
the drive unit includes a first drive unit connected to the first capacitor and a second drive unit connected to the second capacitor,
the first resonant frequency is a resonant frequency when the first drive unit drives the resonant circuit, and
the second resonant frequency is a resonant frequency when the first drive unit and the second drive unit drive the resonant circuit.

13. The power supply apparatus according to claim 10, wherein
the drive unit includes a first drive unit connected to the first capacitor and a second drive unit connected to the second capacitor,
the first resonant frequency is a resonant frequency when the first drive unit drives the resonant circuit, and
the second resonant frequency is a resonant frequency when the second drive unit drives the resonant circuit.

14. The power supply apparatus according to claim 9, wherein
the lumped parameter element comprises a capacitor connected to the power supply coil and an inductor connected to the capacitor,
the first resonant frequency is determined by the capacitor and the power supply coil, and
the second resonant frequency is determined by the capacitor, the inductor, and the power supply coil.

15. The power supply apparatus according to claim 1, further comprising: a voltage phase detector that detects the phase of the voltage applied to the power supply coil, wherein
the phase difference is a phase difference between the phase of the drive signal and the phase of the voltage applied to the power supply coil.

16. A method for controlling a power supply apparatus, the method comprising:
changing a resonant frequency of a resonant circuit between a first resonant frequency and a second resonant frequency based on a phase difference between a phase of a drive signal of a drive unit and a phase of at least one of a current and a voltage flowing in a power supply coil of the resonant circuit being eliminated, wherein the first resonant frequency is higher than a frequency of the drive signal, and the second resonant frequency is lower than the frequency of the drive signal.

17. The method according to claim 16, wherein the changing causes a switch to change between the first resonant frequency and the second resonant frequency.

18. The method according to claim 16, further comprising:

outputting, with a phase comparator, the phase difference as a voltage value proportional to the phase difference.

19. The method according to claim 16, further comprising:

detecting, with a voltage phase detector, the phase of the voltage applied to the power supply coil, wherein the phase difference is a phase difference between the phase of the drive signal and the phase of the voltage applied to the power supply coil.

* * * * *